Frank P. Kobert, Inventor
By his Attorney
Edward M. Evarts

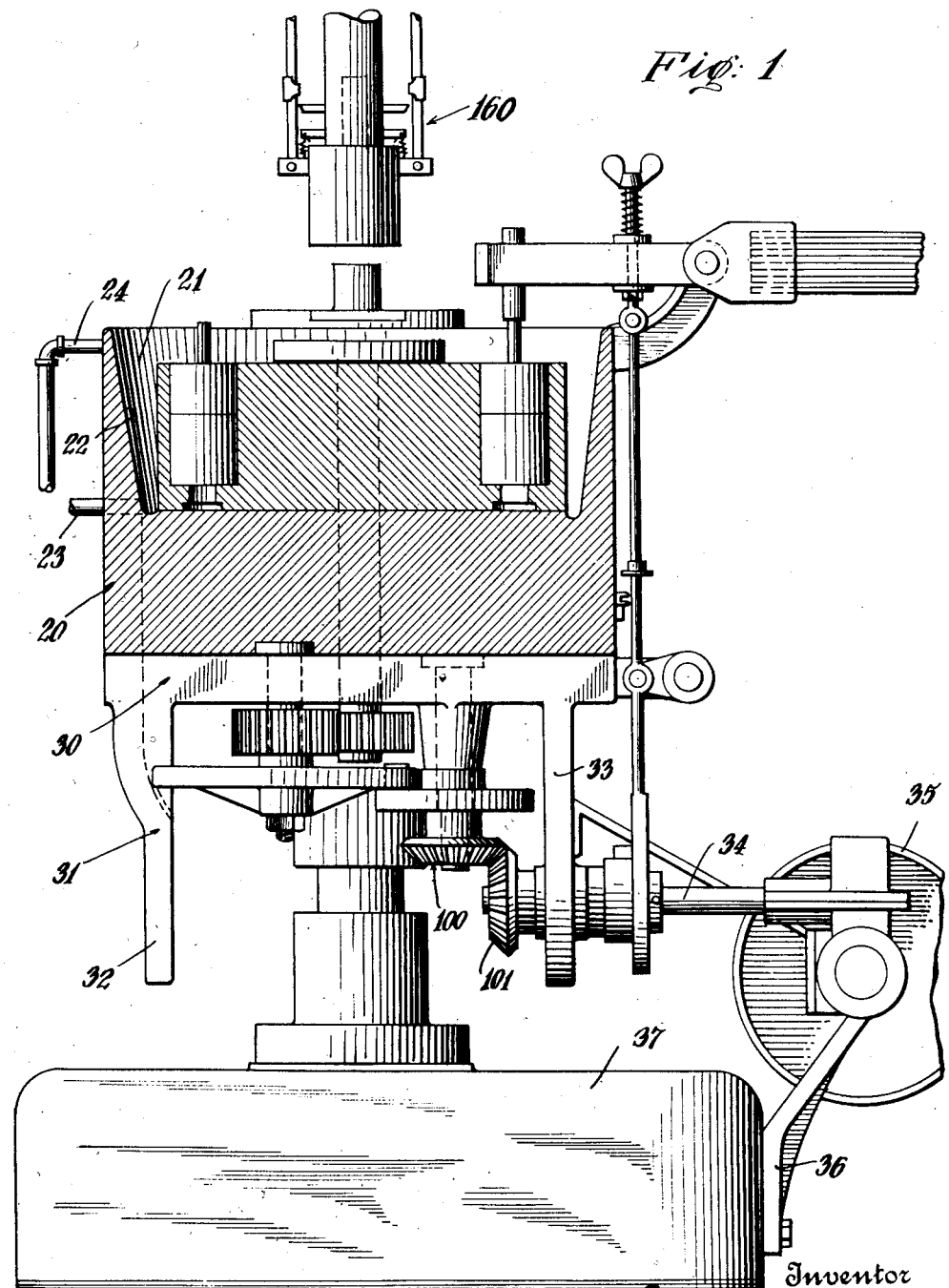

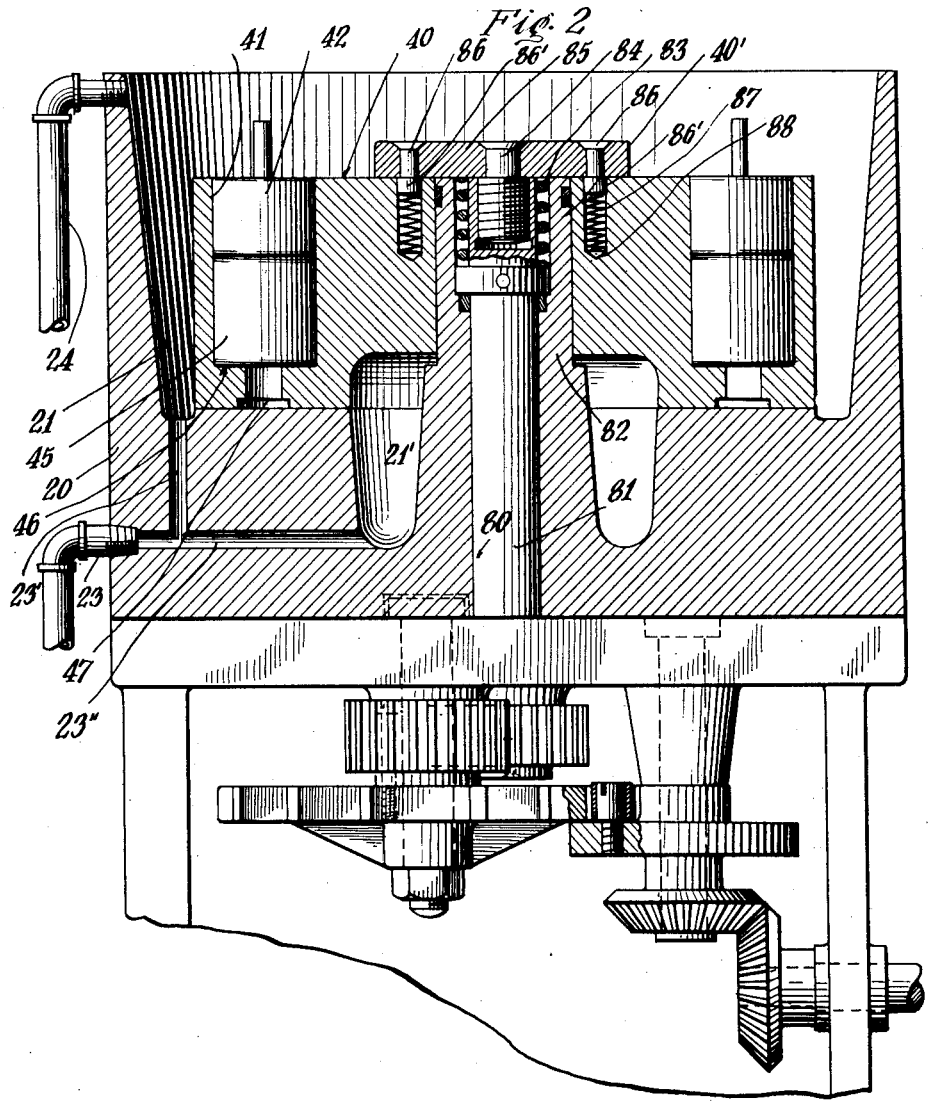

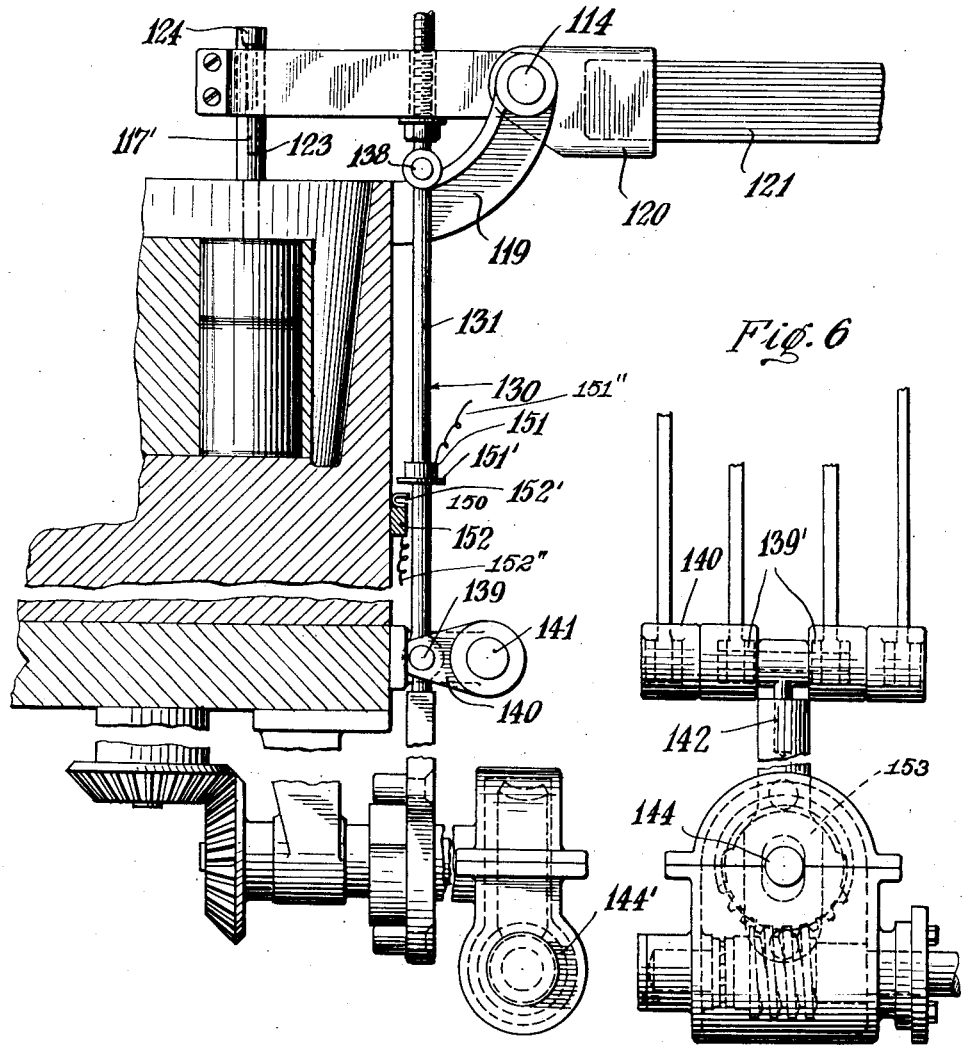

June 25, 1929.   F. P. KOBERT   1,718,364
ELECTRICAL HEATING AND FORGING MACHINE
Filed May 13, 1927   8 Sheets-Sheet 5
Fig. 7
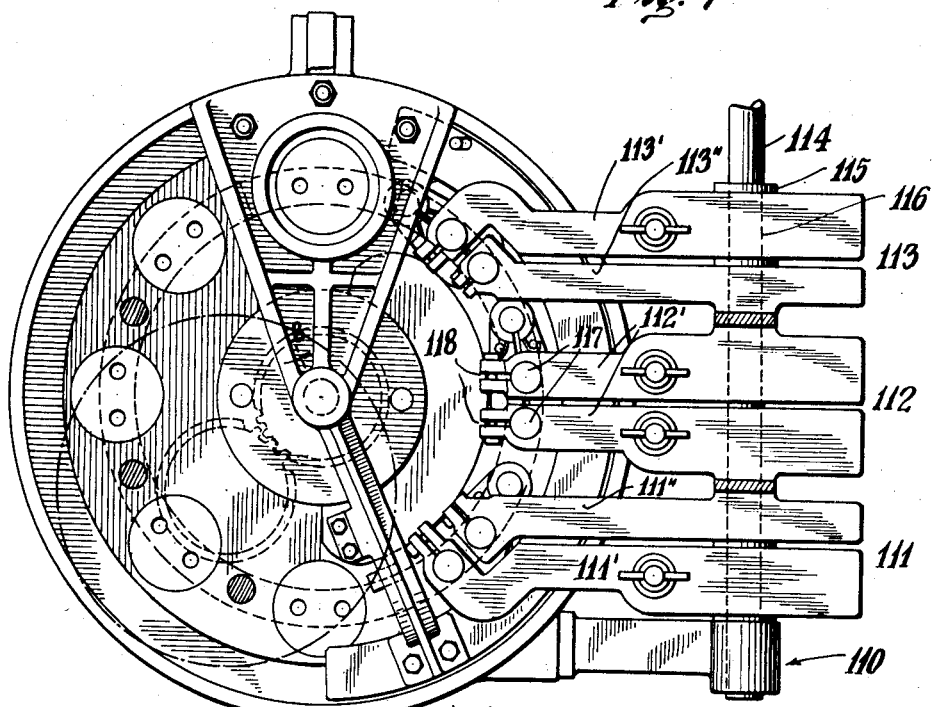
Fig. 8
Fig. 9
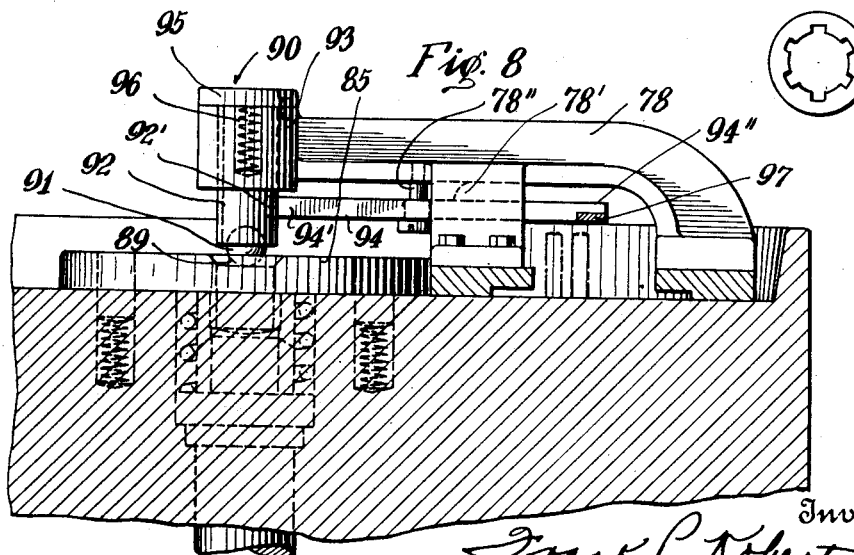
Inventor
Frank P. Kobert
By his Attorney
Edward M. Evarts June 25, 1929.  F. P. KOBERT  1,718,364
ELECTRICAL HEATING AND FORGING MACHINE
Filed May 13, 1927   8 Sheets-Sheet 6
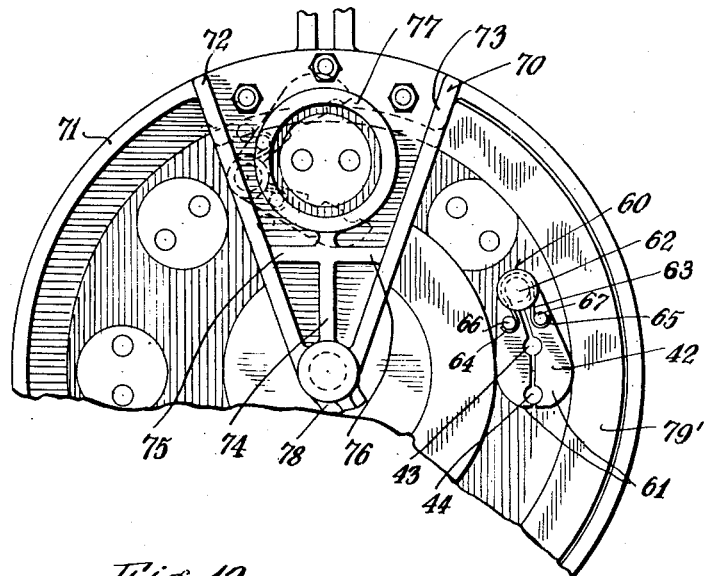
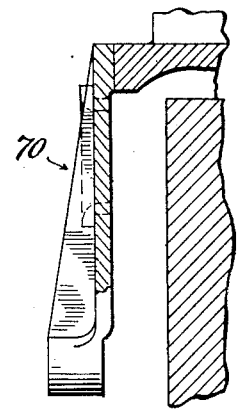
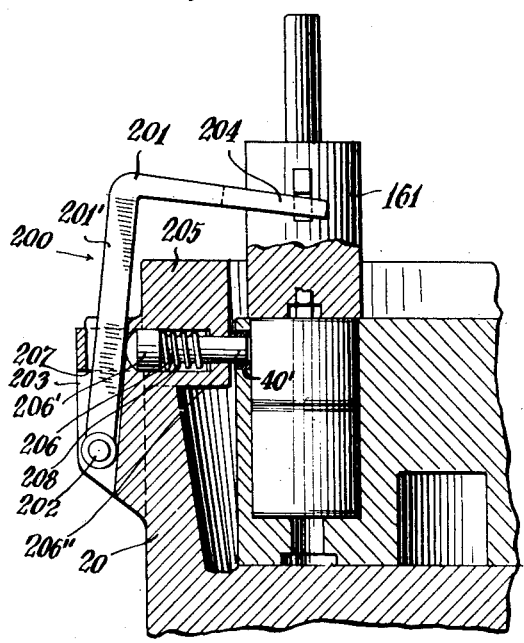
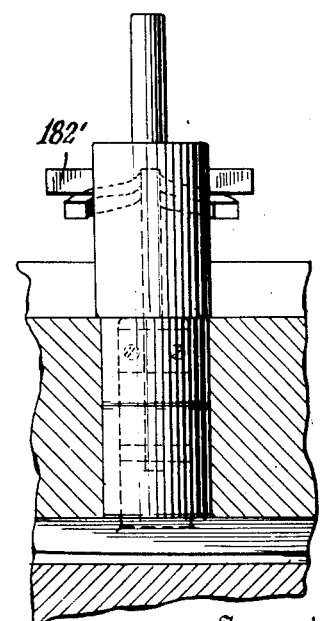
Inventor
Frank P. Kobert
By his Attorney
Edward M. Evarts

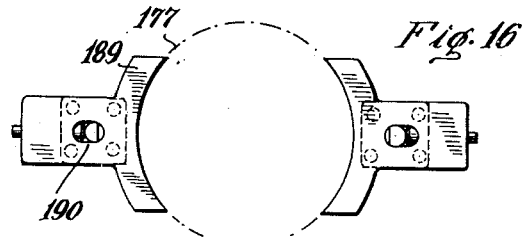
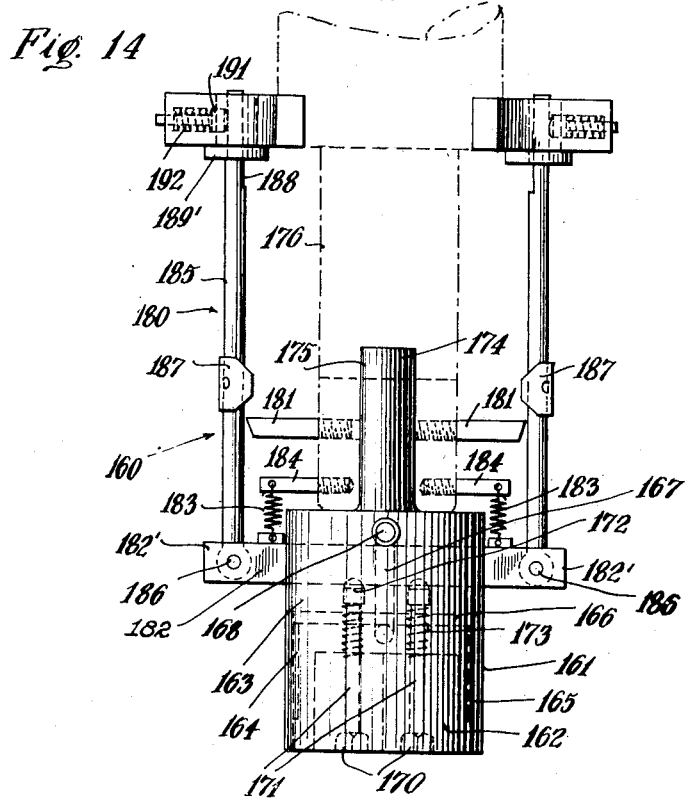
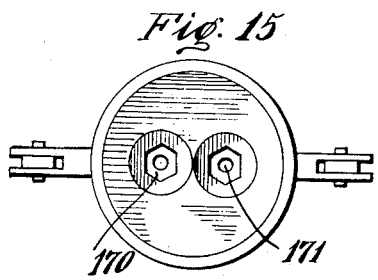

Patented June 25, 1929.

1,718,364

UNITED STATES PATENT OFFICE.

FRANK P. KOBERT, OF SPRINGFIELD, MASSACHUSETTS, ASSIGNOR TO ELEKTROMATIK FORGING MACHINE CORPORATION, OF NEW YORK, N. Y., A CORPORATION OF NEW YORK.

ELECTRICAL HEATING AND FORGING MACHINE.

Application filed May 13, 1927. Serial No. 191,192.

My present invention relates to electrical heating and forming devices operating on an entirely different principle and constituting altogether different devices from those hitherto devised by me and employed in the art, and aims to devise electrical heating and forming devices which are comparatively simple in construction, which are convenient and economical to fabricate and to assemble, which are convenient and expeditious in operation, and which, in certain of their forms, permit the heating, preferably in successive stages, of pairs of the work-pieces to be heated and thereafter formed in the electrical heating devices of the present invention, and their formation in an expeditious, economical and otherwise satisfactory manner, the heating operation being preferably conducted in such a manner as to localize and concentrate the heating effect substantially in those portions of the work-pieces which are desired to be formed and minimize the heating effect on the dies or other forming members for conducting the forming operations, thus minimizing the wear and tear on the machines by the high heating action of the machines. Other objects and advantages of the present invention will in part be obvious to those skilled in the art to which the present invention relates and will in part be pointed out in detail hereinafter.

In the accompanying specification I shall describe, and in the annexed drawing show, an illustrative embodiment of the present invention. It is, however, to be clearly understood that my invention is not limited to the illustrative embodiment herein shown and described for purposes of illustration only. It is, furthermore, to be understood that the method inherent in one type of operation of the aforesaid illustrative embodiment of the present invention forms no part of said invention but is more fully described and claimed in a copending application of mine filed of even date herewith and entitled "Electrical heating methods".

Referring now to the drawing, wherein I have illustrated the aforesaid illustrative embodiment of the present invention:

Fig. 1 is a side elevation, partly in section, of the aforesaid illustrative embodiment of the present invention;

Fig. 2 is a cross sectional view, partly in elevation, of the die-carrying member forming a part of the aforesaid illustrative embodiment of the present invention;

Fig. 5 is a cross sectional view, partly in elevation, showing the electrode-operating mechanism;

Fig. 6 is a side elevation illustrating a portion of the electrode-operating mechanism;

Fig. 7 is a plan view of the electrode arrangement illustrating also the safety device;

Fig. 8 is a view, partly in section and partly in elevation, illustrating the safety device;

Fig. 9 is a detailed view of the splined end of the driving shaft for the die-carrying member;

Fig. 10 is a plan view of the die-carrying member showing the bridging members preferably associated with each die member carried by the die-carrying member and showing also the cam guide-way for operating such bridging members, together with the punch guide which may be employed;

Fig. 11 is a side elevation, partly in section, of the punch guide;

Fig. 12 is a view, partly in section and partly in elevation, showing one form of means which may be employed for accurately positioning each die member for the punching operation;

Fig. 13 is a side elevation of the positioning means shown in Fig. 12 of the drawing;

Fig. 14 is a side elevation, partly in section, of the punch-operating and work-piece ejecting mechanism;

Fig. 15 is a top plan view of the same;

Fig. 16 is a plan view of a detail of the punch mechanism;

Figure 4:
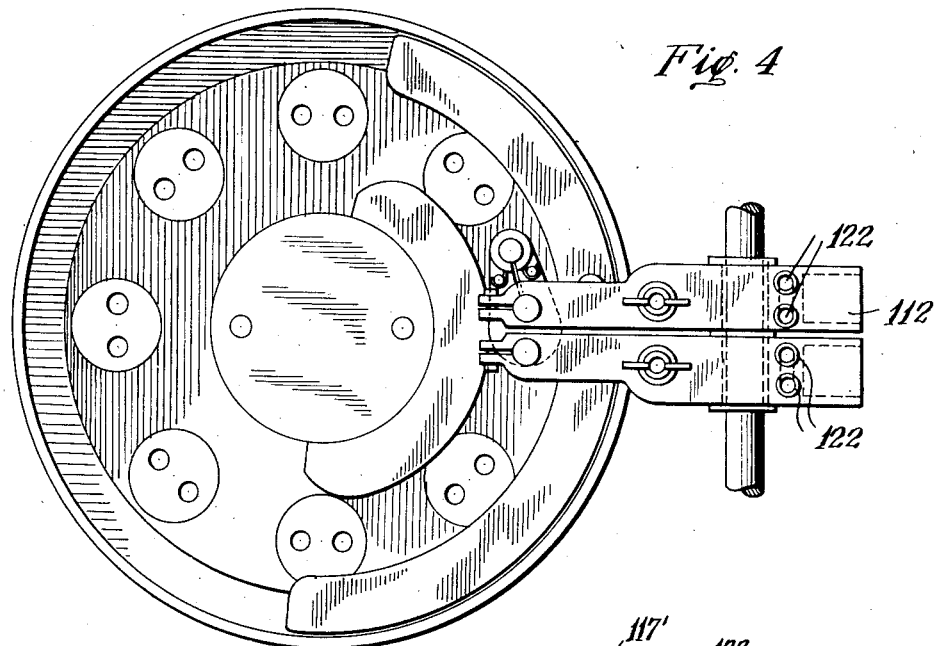
Fig. 4 is a plan view, partly broken away, of one of the pair of electrodes, such as the central or middle pair of electrodes, where but three pairs of heating electrodes are employed.

Referring now to the aforesaid illustrative embodiment of the present invention and more particularly to the drawing illustrating the same, the machine comprising such embodiment preferably comprises a tank 20 which may be of case steel and which rests upon a table or platform 30 set into the framework 31 of the machine itself. The tank 20, which is stationary, is provided with the depending arms or brackets 32 and 33, the bracket 33 serving as a bearing for the main drive shaft 34 driven by suitable gearing, generally designated by reference character 35, supported by the arm or bracket 36 attached to the bottom platform 37 constituting a part of the framework 31 of the machine.

It will be noted that the tank 20 is provided with the inner space 21 and has the tapering inner wall 22. At 23 I have indicated an inlet for cooling fluid. Preferably the cooling fluid is heated above normal temperatures so as not too abruptly to chill the die members and the work-pieces carried thereby, all of which become highly heated during the heating and forging operations. I prefer also that the cooling fluid entering the space 21 within the container 20 shall be alkaline, as by consisting of a solution of an alkaline carbonate, such as sodium carbonate, of any desired strength, such as a 10 per cent solution of sodium carbonate. The inlet 23 is located adjacent the bottom of the space 21. At 24 I have indicated the overflow or outlet for the cooling fluid. The inlet 23 and the outlet 24 preferably communicate with a forced circulation system, including a pump and preferably including also a filter, these being of the usual construction and being, therefore, not deemed necessary here to be shown.

It will be noted, as more clearly shown in Fig. 2 of the drawing, that the inlet 23 is branched to provide a portion 23′ communicating with the space 21 and a portion 23″ communicating with an inner space 21′, communicating through the usual crevices and openings with the space 21, thus providing circulating cooling fluid for the various spaces within the receptacle 20.

Figure 17:
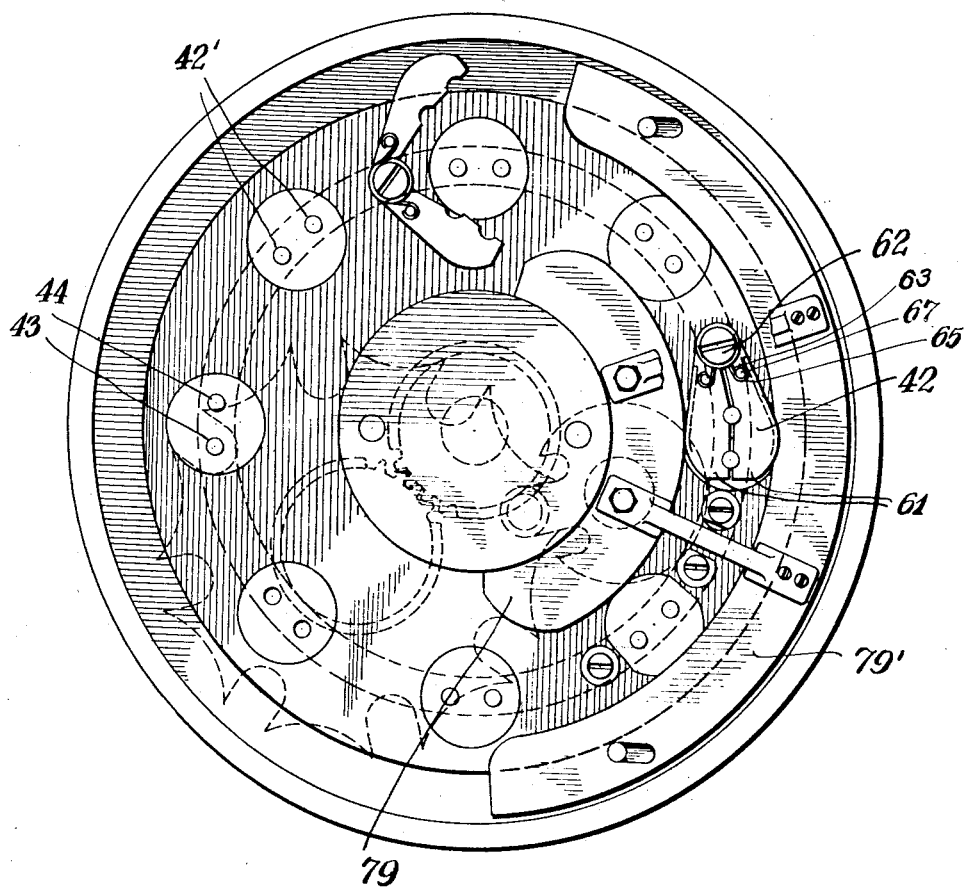
Fig. 17 is a top plan view of the die-carrying member and the dies carried thereby, showing also the mechanism for operating the bridging members and the bridging members themselves.
Figure 18:
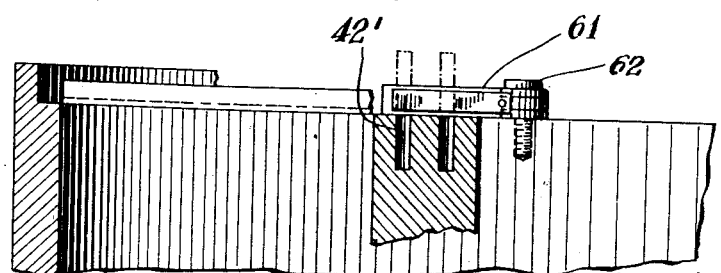
Fig. 18 is a cross sectional view of the die-carrying member and the dies carried thereby showing some of the work-pieces in position to be operated upon.

Suitably mounted for rotation within the receptacle 20 is a die-carrying member generally designated by reference character 40 and preferably comprising a substantially circular platform or dial which may be of cast steel and which is provided with a series, here shown at eight, substantially cylindrical depressions 41 in which the die members, likewise eight in number and here designated by reference character 42, may be rigidly and fixedly positioned, as by being keyed in the depressions 41. As clearly shown in Figs. 2, 17 and 18 of the drawing, the die members 42 are substantially circularly arranged. Each die member 42 is preferably made of a properly shaped and properly dimensioned solid block of steel cored or otherwise provided with a pair of cylindrical or other suitably shaped cavities or depressions 42′ for receiving the similarly shaped pair of work-pieces 43 and 44.

For purposes of illustration I shall show the machine comprising the aforesaid illustrative embodiment of the present invention as particularly designed and adapted for the manufacture of hexagonal-headed bolts. It is, however, to be clearly understood that the machine may be as readily adapted for a very wide variety of articles of different shapes and characters. In the present instance, however, and assuming that the machine is to manufacture hexagonal-headed bolts, the cavities 42′ in the die member 42 may be cylindrical in form and the work-pieces 43 and 44 may be similarly cylindrically formed and may constitute cylindrical rods of steel of the desired dimensions to fit snugly into the cavities 42′. Since there are eight die members 42 and each contains a pair of cavities 42′ adapted to snugly receive a pair of work-pieces 43 and 44, there will be present in the machine at one and the same time, when it is fully loaded, eight pairs of work-pieces or sixteen work-pieces in all. It may here further be stated that in the machine as illustrated there are preferably two loading stages, corresponding to two die members 42, three heating stages, corresponding to three of the die members 42, one forming stage, corresponding to one of the die members 42, and two unloading stages, corresponding to the remaining two die members 42.

Each die member 42, keyed or otherwise fixedly secured within its particular cavity 41, rests on a cored steel or other suitable block 45 on the shoulders 46 of such cavity, an aperture 47 being provided communicating with each cavity 41 from the lower face of the die-carrying member 40. Each of the die members 42, as more clearly shown in Fig. 3 of the drawing, is provided with a plurality of thrust pins 48, the upper ends 48′ of which fit into the cavities 42′, and the lower enlarged portions 48″ of which are adapted to ride on a cam 50 cut away, as at 51 and 52, for a purpose subsequently to be described and attached, as by the screws 53, to the lower inner surface 20′ of the receptacle 20. The cut-away portions 51 and 52, defining the space 54 between them free from a portion of the cam 50, correspond to the forming stage of the operation in which the work-pieces, having been heated in the previous heating stages, are lowered slightly to permit just that portion of the same to be formed which has been heated to a forging temperature, as will be described in considerable detail hereinafter.

As more clearly shown in Figs. 10, 11, 17 and 18 of the drawing, there is associated with each die member 42 electrically conductive bridging means, generally designated by reference character 60 and providing means whereby the plurality of work-pieces in each die member may be bridged in an electrically conductive manner to substantially localize the heating current and thus localize the effective heating action in those portions of the work-pieces which it is desired to heat to a forging temperature. By this means, it is possible to prevent any substantial heating and thus softening of those portions, such as the lower portions of the work-pieces, which it is not desired to heat to a forging temperature, thus permitting such lower portions to constitute rigid supports for the heated upper portions of the work-pieces for the forming operation. This arrangement also economizes the electrical heating current and the heat and gives a neater and more accurate job.

While various means may be employed for this purpose within the spirit of the present invention, I prefer to employ the means illustrated in the drawing and comprising a pair of clamping members 60 pivoted about a stud 62 adjacent each of the die members 42, the studs 62 and the pivoted arms 61 carried thereby being arranged in the form of a substantially circular series. Mounted about the studs 62 are means, such as an expansion spring 63, for normally maintaining the clamping arm 61 in spread apart or inoperative position. For this purpose, the spring 63 may be provided with the looped portions 64 and 65 passing around the pins 66 and 67, respectively, forming parts of the arms 61. It will thus be noted that when the arms 61 are closed about the intermediate portions of the work-pieces 43 and 44, they will bridge in an electrically conductive manner such intermediate portions of the work-pieces to thus limit the effective heating action and the effective path of the heating current to the upper portion of the work-pieces which it is desired to heat to a forging temperature for the subsequent heating operation.

As more clearly shown in Figs. 10, 11, 17 and 18 of the drawing, I provide means for operating the bridging or clamping means 61 to bring the same into operative or bridging position and thereafter to permit the same to assume an inoperative or nonbridging position. While various means may be employed for this purpose, I prefer to employ the means shown in the drawing and comprising a skeleton framework generally designated by reference character 70 and preferably comprising the outer ring 71, constituting a part of the framework of the machine, the radial arms 72 and 73, the bracing arms 74, 75 and 76, the punch guide 77, and the bracket arm 78 carrying one of the cam tracks 79, the remaining cam track 79′ being carried by the outer ring 71 or some other suitable portion of the framework of the machine. It will thus be noted that in the rotation of the die-carrying member and the dies and bridging means carried thereby, in a counter-clockwise direction, looking down upon the die-carrying member 40, the bridging arms 61, which are preferably made of copper, bronze or some other good electrical conductor, are brought into engagement with the cam tracks 79 and 79′ in such a manner that the arms 61, normally pressed apart by the action of the spring 63, will be closed in wing fashion to clamp or bridge the work-pieces 43 and 44 for the heating operation, which is preferably, as already indicated above, conducted in three different stages.

I now provide means for intermittently moving, preferably for intermittently rotating, the die-carrying member 40 and thus the die members 42 carried thereby. Such means should be so designed and arranged as to drive the parts mentioned in an intermittent manner permitting the heating to take place under the action of the heating electrodes during the periods of rest of the die-carrying means and the die members carried thereby, and in turn carrying the work-pieces, and likewise permitting, during such periods of rest, the loading operation, the forming operation, and the removing or ejecting operation to be conveniently performed.

While various means may be employed for this purpose, I prefer to employ the means illustrated more particularly in Figs. 2, 3, 7, 8 and 9 of the drawing, in which I have illustrated suitable driving means, generally designated by reference character 80, and comprising a driving shaft 81, passing through the center of the die-carrying member 40, which die-carrying member 40 is perforated for this purpose, as designated by reference character 40′. The shaft 81 is suitably borne in the bearing 82 forming a central extension or sleeve on the container 20 and carrying the cylindrical expansion spring member 83 for the suitable support of the shaft 81 forming a part of the driving mechanism. The upper member 84 of the shaft 81 is preferably of reduced diameter and is splined, as more clearly shown in Fig. 9 of the drawing, for engagement with the internally splined driving plate 85 which, therefore, may have a longitudinal adjustment with respect to the shaft 81 but is compelled to rotate with the same when the shaft 81 rotates. The driving plate 85 is provided with a plurality of pins 86 set into the same so as to rotate therewith, these pins 86 being slightly enlarged at their lower ends 86′ so as to snugly enter the corresponding cavities or depressions 87 formed in the die-carrying member 40. These depressions 87 carry the expansion springs 88 within the same. It will thus be noted that when the driving plate 85 is in depressed position with the pins 86 within the cavities 87, thus compressing the springs 88, the die-carrying member 40 will be driven as the driving plate 85 and the shaft 81 are rotated.

The driving plate 85 and the pins 86 thereof are normally maintained in driving position against the action of the compression springs 88 by any suitable mechanism, such as the mechanism illustrated in Figs. 7 and 8 of the drawing. This drive control mechanism, generally designated by reference character 90, preferably comprises a ball-bearing 91, the lower face of which rests in a rounded depression 89 at the center of the driving plate 85 and the upper portion of which is carried in a plunger 92 carried in the sleeve-like substantially central portion 93 of the bracket arm 78 already described. This bracket arm, which is fixed or stationary and constitutes a part of the framework of the machine, is provided with the depending projection 78' and is also provided with the pivot 78" in the form of an adjustable screw on which is pivotally mounted the trigger 94 for releasing the drive control sleeve 92.

Within the central sleeve portion 93 of the bracket 78, which is provided with the upper head or cap 95, is the expansion spring 96 which serves normally to press the sleeve 92 downwardly to thus cause the ball 91 to bear against the driving plate 85 to thus maintain the same and the pins 86 thereof in driving position against the action of the springs 88 already described. The sleeve 92 is provided with a lateral notch 92' engaged by the inner end 94' of the trigger 94. This engagement normally maintains the sleeve 92 in lowered position for engagement of the ball 91 with the driving plate 85 for driving the die-carrying member 40 and the die members carried thereby.

At its outer end 94" the trigger 94 carries the projection 97 which is adapted, if any of the work pieces 43 and 44 extend more than the desired amount above the die members 42 and the die-carrying member 40, in which the die members 42 are positioned, to spring the trigger to release the sleeve 92 and to thus permit the driving plate 85 to be lifted under the action of the springs 88 against the action of the weaker spring 96 to bring the pins 86 out of the cavities 87 in the die-carrying member 40 to thus interrupt the rotation of the die-carrying member 40 and of the die members 42 carried thereby, which die members in turn carry the work-pieces 43 and 44. Accordingly, this arrangement avoids the danger of presenting to the subsequent heating operations and to the final forming operation work-pieces which are either too large or which have been improperly positioned, the first heating operation, by the impact of the electrodes, serving normally to position the work-pieces properly for the subsequent heating stages and the subsequent working operation.

The shaft 81 is itself driven by any suitable means, such as a Geneva gear drive, generally designated by reference character 100, which is itself driven by means of a bevelled gear 101 carried by the inner end of the main drive shaft 34. Since this Geneva gear is of the usual type of construction, it is not deemed necessary to further describe the same here except to point out that it is adapted to intermittently drive the die-carrying member 40 so as to present the die members 42 carried thereby and the work-pieces 43 and 44 therein during the periods of rest of the designated members successively for each of the three heating stages and for the forming stage as well as for the loading and unloading stages.

I provide suitable electrical heating means, preferably in the form of heating electrodes, adapted to pass electrical current for heating purposes through portions, at least, of the work-pieces in the machine. I prefer that the electrodes shall be arranged in pairs adapted to act simultaneously on parts only of pairs of work-pieces, so that the current passes from one electrode through the predetermined portion of one work-piece, through the bridging or clamping means already described, to the exposed predetermined portion of the other work-piece and thus to the remaining electrode the arrangement being a series arrangement with the bridging or clamping means forming a part of the circuit and serving thus to limit the heating current and the heating action to those portions of the work-pieces which are above the bridging or clamping means and in contact with the electrode. By means of this arrangement suitable economies in current and heat are effected, the heat is localized in the portions of the work-pieces desired to be heated to a forging temperature and thereafter forged, and other results of considerable practical importance are thus obtained.

For this purpose, I may provide the heating means generally designated by reference character 110 and comprising, in the present instance, as more clearly shown in Fig. 7 of the drawing, three pairs of electrodes, the electrodes being arcuately disposed, the sets of electrodes being designated by reference characters 111, 112 and 113. I prefer that the three pairs of electrodes shall be so arranged as to be simultaneously operable downwardly into heating position and upwardly into non-heating position. For this purpose all of the electrodes are mounted on an oscillatable rod or shaft 114, being spaced from each other by suitable insulating washers 115 and being spaced from the rod or shaft 114 by suitable insulating sleeves 116, so that the electrodes are properly insulated from each other and from the framework of the machine.

The electrodes proper are in the form of copper rods 117 clamped in the holding arms making up the electrodes, these arms being designated by reference characters 111', 111", 112', 112" and 113', 113". These arms are split at their outer ends, as indicated by reference character 118, to permit the electrodes proper 117 to be suitably but removably held in place in their respective arms. The arms themselves may be given a rocking movement about the shaft 114 to bring the electrodes into heating position, as more clearly shown in Figs. 3 and 4 of the drawing. For this purpose, the shaft 114 may be oscillatably supported in a pair of arms 119 suitably carried by the framework of the machine, as more clearly shown in Fig. 5 of the drawing. At their rear ends the electrodes are hollowed out, as indicated by reference character 120 to receive the leads 121 which go to the terminals of the secondary of a step-down transformer adapted to yield a high flow of current under the relatively low voltages required for electrical heating under the conditions now being described.

Figure 3:
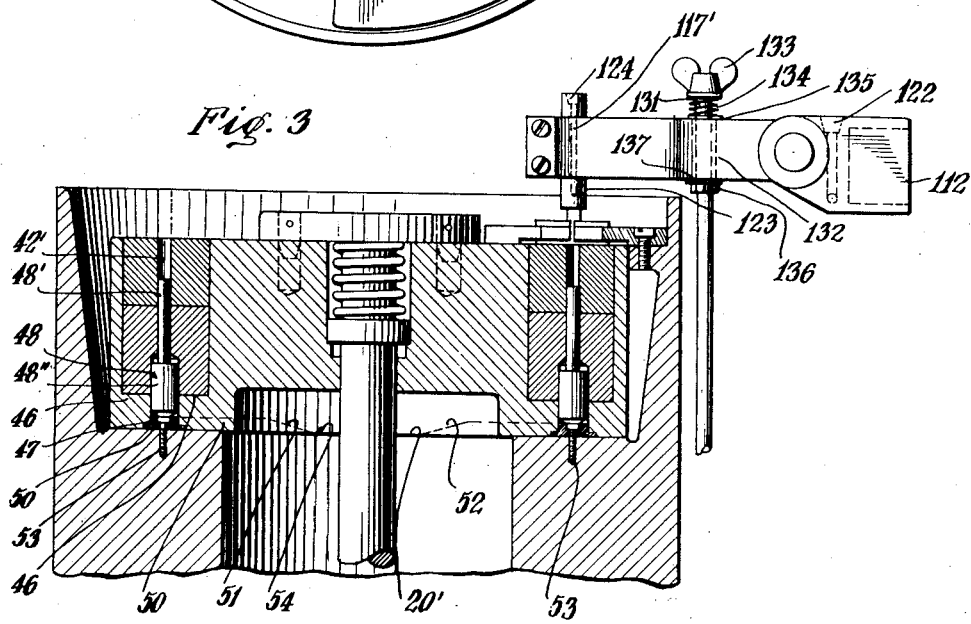
Fig. 3 is a view similar to Fig. 2 showing the die-carrying member with relation to one pair of electrodes forming a part of the aforesaid illustrative embodiment of the present invention.

As more clearly shown in Figs. 3 and 4 of the drawing, the rear end of each electrode is provided with a plurality of communicating closed passageways 122 which communicate with some circulating cooling medium by means of nipples and flexible pipes or tubes, not deemed necessary here to be shown, the purpose of which is to cool the rear ends of the electrodes to prevent their becoming overheated. In a similar manner, as more clearly indicated in Figs. 3 and 5 of the drawing, the electrodes 117 proper are cored, as indicated at 117', to permit the passage therethrough under forced circulation of a cooling fluid, such cooling fluid entering, for example, at the inlet 123 and leaving the electrode proper by the outlet 124, connection being provided with the source of cooling fluid under forced circulation by means of nipples and pipes or tubes, not deemed necessary here to be shown. Of course, the cooling fluid for the electrodes 117 proper and for the rear ends of the arms holding the electrodes 117 may be one and the same source of supply of cooling fluid.

In order to operate the electrodes up and down, up into non-heating position, and down into heating position, I may employ any suitable means, such as the means illustrated in Figs. 5 and 6 of the drawing, and there generally designated by reference character 130. As shown in the designated figures of the drawing, the operating means 130 may comprise a series of rods 131, one passing through each of the electrode supporting arms through the passageway 132 in each such arm. The upper end of each rod 132 carries the adjustable wing nut 133, the upper end of each rod 131 being threaded for this purpose. An expansion spring 134 is provided positioned around the upper end of each rod 131 between the lower face of the wing nut 133 and the upper face of a washer 135 bearing against the upper face of each electrode-carrying arm. Each rod 131 also carries below the corresponding electrode-carrying arm an adjustable nut 136 provided with the washer 137, each rod 131 being threaded for this purpose. It will thus be noted that there is a certain amount of lost motion or free play provided in the downward movement of each rod 131 and the corresponding downward swinging movement of each electrode-carrying arm and the electrode carried thereby, this lost motion being provided by means of the spring 134 arranged as above described.

The rod 131, immediately below the nut 136, is preferably provided with the pivotal joint 138 and with the second pivotal joint 139, thus giving the rod 131 a certain amount of free play desirable for permitting the ready and convenient oscillatory movement of the electrode-carrying arms and the electrodes carried thereby downwardly into heating position and upwardly into nonheating position. The pivotal joints 138 may all be about a rod passing through the rods 131, just as the pivotal joints 139 may all be about a rod passing through the rods 131. Sleeves 140 may be provided mounted on a rod or shaft 141 for helping to guide the rods 131 in their up and down movements, the inner ends of the sleeves 140 receiving the lower pivotal portions of the rods 131 and the pivot rod 139, and the outer ends of the sleeves 140 being positioned about the rod 140.

Passing about a substantially intermediate or central portion of the rod 139 is a crank member 142 at the lower end of which may be an eccentric sleeve 143 positioned about an eccentric 144 carried by the main driving shaft 34 of the machine. It will thus be noted that upon the rotation of the main driving shaft 34 carrying the eccentric 144 about which is positioned the eccentric sleeve 143 carrying the crank 142, through which passes the rod or pivot member 139, the rods 131 will be reciprocated up and down, thus reciprocating the electrode carriers and the electrodes 117 carried thereby, the downward or lowermost position of the eccentric and associated parts corresponding to the heating position, and the upward or uppermost position of the eccentric and associated parts corresponding to the non-heating position of the electrodes. It may here be stated that any suitable gear reduction mechanism, such as a worm gear drive 144' illustrated in the drawing, but which need not here be further described, since it is of the usual and ordinary type of construction, may be employed for providing proper driving means for the electrode-operating mechainsm. It may here further be stated that the rod or shaft 139 may be provided with the split or otherwise adjustable timing cams 139' for providing independent regulation or adjustment of the rods 131 and the electrodes operated thereby to properly time each electrode as to the exact time and period of its operation.

I provide means for closing the circuit, preferably the primary circuit or circuits, of the transformer supplying heating current to the various sets of electrodes, such means preferably being so arranged as to close such primary circuit or circuits only after the electrodes are in contact with the work-pieces and to break such circuit or circuits while such electrodes are still in contact with the work-pieces. This arrangement is preferred, since it prevents arcing and minimizes the hazards arising out of the operation of such a machine. While various arrangements may be used suitable for this purpose, I prefer to employ the means illustrated in the drawing and generally designated by reference character 150 and comprising an upper contact member 151 carried by alternate ones of the rods 131 and a lower contact member 152 carried by some suitable portion of the framework of the machine and suitably insulated therefrom.

It will thus be noted that each pair of electrodes is provided with its own circuit maker and breaker. In fact, I prefer that a satisfactory step-down transformer be employed for each pair of electrodes, separately controlled and separately regulated by its rheostat or the like and provided with its separate circuit maker and breaker. This is so that I may readily effect individual control of the characteristics of the heating operation at each of its stages, thus permitting the relative adjustment of the degrees of heat which may be obtained at each heating stage to adjust the heating characteristics to the particular class of work being operated upon. However, if desired, the three sets of electrodes may be provided with current in parallel or in series from one transformer properly regulated and controlled, although this arrangement is not the preferred one in view of the varying characteristics of the work-pieces, especially under varying heat conditions, and in view of the desirability of having each pair of electrodes independently provided with current and independently regulated.

The upper contact member 151 is provided with the contact finger 151' and with the connection wire 151'', while the lower contact member is provided with the spring contact 152' and the lead wire 152'', the spring contact 152' permitting the proper contact to be made and kept during the downward movement of the rod 131 after the electrodes are in contact with the work-pieces by reason of the provision of the spring 134, the lost motion taking off the jar from the machine and permitting the circuit to be made and broken in the manner already indicated. The wires 151'' and 152'' either go directly to the respective primaries of the step-down transformers supplying current to the various sets of electrodes and not deemed necessary here to be shown, or may go instead to relays which automatically close the primary or secondary circuit upon the closing of the relay circuits by the contact members 151 and 152.

I provide suitable means for forming those portions of the work-pieces which have been heated to a forging temperature. For this purpose, I prefer to use the mechanism shown in the drawing and there generally designated by reference character 160. As illustrated in the drawing, particularly in Figs. 1 and 12 to 18, inclusive, the means 160 comprises a water-cooled punch 161 provided with the forging or die member 162 which member 162 is inserted into a suitable cavity into the lower portion of the punch proper 163. Passageways 164, 165, 166 and 167 are provided for the circulation of cooling fluid which may enter, as shown, at 168 and may leave at an opposite point in the punch proper 163, which opposite point is not deemed here necessary to be shown, nipples and connection pipes or tubing, preferably flexible, and likewise not deemed necessary to be shown, being provided in the usual manner.

The member 162 is provided with a plurality of impressions 170 each of which is preferably in the form of a hexagonal impression in the die member to provide the ends of the work-pieces 43 and 44 with hexagonal heads in the fabrication of hexagonal-headed bolts. Ejector pins or rods 171 extend into the respective cavities 170, the upper ends 172 of the rods 171 being rounded and being of slightly enlarged diameter to provide seats for the upper ends of the expansion springs 173 surrounding the upper ends of the rods 171 between the heads 172 and the upper face of the die member 162. The upper end of the punch 161 is of reduced diameter and is indicated by reference character 174 and is located in the cavity 175 of the ram 176 forming a part of the ram carrier 177. The ram carrier 177 may be given the desired reciprocating motion by means of any suitable mechanism, not here deemed necessary to be shown, such as an eccentric carried by the main driving shaft 34, an eccentric sleeve surrounding said eccentric, and any desired connection means for properly timing the movements of the ram carrier and thus of the punch and the die member carried thereby.

I provide means for operating the ejecting pins 171 to eject the formed work-pieces, should the same tend to adhere within the cavities 170 of the die member 162, and for rendering such ejecting means normally inoperative. While various means may be employed for this purpose, I prefer to employ the means illustrated in the drawing and generally designated by reference character 180.

As shown in the drawing, the ram 176 is provided with a plurality of spreading members 181 threaded into, or otherwise suitably attached to, the ram 176 so as to be reciprocatable therewith. At 182 I have illlustrated a stripping member which bears against the upper ends 172 of the ejector pins 171 which are normally maintained in elevated or inoperative position by means of the expansion springs 173 already described. The stripping member 182 is normally kept in elevated or inoperative position by means of the tension springs 183, of which two are here shown, such springs being attached to the outer ends of the rods 184 threaded into or otherwise suitably attached to the ram 176. It may here be stated that the upper portion of the die-carrying member or punch 161 is suitably channelled or slotted to permit the necessary free play for the stripping member 182 in the manner subsequently described.

Pivoted at the outer ends 182' of the stripping member 182 are a plurality of oscillatable rods 185 pivoted to the aforementioned ends of the stripping member 182 at the pivot points 186 and being provided intermediate their ends with the enlarged portions or cam members 187 and being cut away at their upper ends, as indicated by reference character 188. Carried by any suitable portions of the framework of the machine are a plurality of arcuate arms or members 189 provided with the slots 190 and further provided with the plungers 191 pressed inwardly by means of the expansion springs 192. The action of the plungers 191, by reason of the springs 192, therefore tend always to press inwardly the pivoted rods 185. The arcuate members 189 are so positioned and arranged as to permit the free movement between them of the ram carrier 177.

The arrangement of parts of the machine just described is such that, assuming that the punch is in its lowermost position, as shown in Fig. 14 of the drawing, and that the forming operation is completed and that the punch is about to move upwardly, as the punch rises, carrying with it the rods 185 and the other parts of the stripping mechanism, the enlarged portions of the rods 185 immediately under the notched ends 188 will strike against the lower slotted plates 189' with which the arcuate members 189 are provided. This temporarily prevents the further rise of the rods 185 and of the stripping member 182 pivoted at the lower ends of the rods 185. This causes, in the continued rise of the remaining portions of the punch mechanism, the stripping member 182 to be brought forcibly down against the upper ends 172 of the ejecting rods 171, against the action of the springs 173, thus causing the ejecting rods to eject the formed work-pieces should the formed heads of the same be found to adhere within the impressions 170 in the die member 162. The continued rise of the punch proper and the ram carrier and ram, brings the rods 181 carried by the ram carrier 176 into contact with the cams or enlarged portions 187 carried by or forming a part of the rods 185. This causes the rods to be oscillated outwardly against the pressure of the plungers 191, acting under the springs 192, and this action, under the influence of the springs 173 and 183, causes the rods 185 to move upwardly through the slots 190 in the arcuate members 189 to thus relieve the pressure on the stripping bar 182, which is thus restored to normal or inoperative position.

I prefer to provide means, preferably associated with the punch 161, for properly centering the punch over the work-pieces and thus to assure that the work-pieces will be properly and accurately forged. For this purpose, I may provide the means illustrated in Figs. 12 and 13 of the drawing and there generally designated by reference character 200. As there illustrated, the punch 161 may be provided with means, which may include the bar 182', for acting upon a pivoted L-shaped member 201 attached to a suitable portion of the framework of the machine, as to the tank 20. The L-shaped bracket 201 has the inner arcuate or forked shaped portion 204, the ends of which are positioned beneath, and may be acted upon by, the striking member, such as the bar 182' carried by the punch 161.

Mounted for reciprocation in a suitable portion of the framework of the machine, as in the wall portion 205 forming a part of the receptacle or container 20, is a spring pressed locking pin, generally designated by reference character 206, adapted to reciprocate in a channel 207 and being normally rearwardly pressed by the expansion spring 208. The outer end 206' of the locking pin 206 is mounted for engagement with the lower arm 201' of the L-shaped member 201, while its forward end 206'' is slightly tapered so as to fit into any one of a series of apertures 40' in the die-carrying member 40, one such aperture being positioned adjacent each of the die members 42 carried in the die-carrying member 40, so that there are in this case eight such apertures or depressions circumferentially disposed about the exterior of the die-carrying member 40. It will thus be noted that as the punch descends, the member 201 will be rocked to the right in Fig. 12 of the drawing to force the locking pin 206 against the action of the spring 208 so that its tapered end 206'' will enter the corresponding aperture 40', thus serving to center and properly position the die-carrying member 40 and the particular die member 42 having the work-pieces heated and in position to be forged for the forging operation conducted by the punch 161.

This completes the description of the construction of the aforesaid illustrative embodiment of the present invention. The manner of assembling such embodiment will, it is believed, be clear from the foregoing description. Likewise, the manner of operating the aforesaid illustrative embodiment of the present invention will be clear from the foregoing description but may be briefly summarized as follows:

The machine having been started in operation by the application to the main drive shaft 34 and the gearing carried thereby of power from any suitable source, not deemed necessary here to be shown, and assuming that there are as yet no work-pieces in the machine, the operator loads the machine with work-pieces, for example, in the form of substantially cylindrical rods, placing two such work-pieces 43 and 44 in each of the cavities 42' in each of the die members 42 carried by the die-carrying member 40. There will thus be positioned in the machine sixteen work-pieces. Two of the eight stages of intermittent rotation for a complete cycle or complete revolution of the die-carrying member 40 being assumed to constitute the loading stages, and referring now solely to a single pair of work-pieces 43 and 44 within the cavities 42' of a single die member 42 carried by the die-carrying member 40, and assuming that the work-pieces 43 and 44 referred to are properly positioned in their lowermost positions within the cavities 42', the thrust pins 48 of the particular die member 42 will ride upon the cam 50, and thus maintain the work-pieces 43 and 44 in their proper position for the subsequent heating operations. The portions of the work-pieces 43 and 44 extending out of the particular die member 42 will depend upon the portions of the work-pieces which it is desired to heat to a forging temperature and thereafter forge. Various lengths of work-pieces 43 and 44 can be selected for this purpose, as also various lengths of the portions 48' of the thrust pins 48 may be selected for a similar purpose.

In its next intermittent rotation the die member 42 and the work-pieces 43 and 44 carried thereby are brought under the first pair of electrodes 111. As the die member and the work-pieces carried thereby are brought into this position, the bridging or clamping means 60, comprising the pair of clamping or bridging arms 161 of electrically conductive material, enter into the space between the cam guide-ways 79 and 79', which therefore serve to clamp or bridge the work-pieces 43 and 44 and thus provide an electrically conductive path across the intermediate portions of such work-pieces, thus localizing the current and heating effect of the current in the upper portions of the work-pieces which it is desired to heat to a forging temperature and subsequently to forge. This action takes place against the action of the spring 63 which normally tends to maintain the arms in spread apart or non-clamping position.

As the work-pieces are brought into position underneath the electrode 111, the electrodes descend until they are in physical contact with the work-pieces. In the continued descent of the rods 131 and with the desired amount of free play provided by the spring 134, the circuit is closed through the electrodes and the heating operation commences in its first stage. This heating operation in its first stage continues for a length of time determined by the speed of the intermittent rotation of the die-carrying member 40 and the die members 42 carried thereby, and will depend also upon the intensity of the current as regulated, preferably as individually regulated, for the particular heating stage now being described, so that such heating may be most effectively performed, considering the nature of the article being heated for the subsequent forging operation.

The first set of electrodes 111 having been maintained in heating position for the desired length of time and having been brought into heating position by the mechanism previously described, the rods 131 are now raised and serve to interrupt the circuit, preferably the secondary circuit of the step-down transformer supplying current to the particular set of electrodes now being considered, but not before the electrodes have been brought out of contact with the work-pieces 43 and 44. The interruption of the circuit before the electrodes are brought out of contact with the work-pieces prevents arcing and minimizes industrial hazards.

In its continued intermittent rotation, the die-carrying member 40 brings the particular die member 42 and the partially heated work-pieces 43 and 44 contained therein, under the next set of electrodes 112. Here the work-pieces are given a second heating to an increased temperature, the electrodes being brought into heating position and the circuit being closed, after which the circuit is opened and the electrodes raised out of contacting position with the work-pieces, in the manner already described for the electrodes 111 during the first stage of the heating operation. Finally, in the continued intermittent rotation of the die-carrying member 40 and the die member 42 carried thereby, the work-pieces 43 and 44, carried by such die-carrying member, and now having been twice heated, are brought under the third and last set of heating electrodes 113 into position to receive the third and last stage of the heating operation. Here also the electrodes 113 are brought into physical contact with the work-pieces, the circuit closed and thereafter the circuit opened and the electrodes raised out of contact with the work-pieces by the mechanism already described as for the electrodes 111 used during the first stage of the heating operation. At each stage the intensity of the current and the increment of heat supplied is regulated and controlled, as already described, preferably by the independent control of the separate step-down or other transformers supplying current to each pair of electrodes.

During all this time, the clamping or bridging members 61 remain in bridging position so that the heating effect is substantially limited to the exposed portions of the work-pieces 43 and 44 above the bridging arms or members 61. During this time also the die members remain in thermal contact with the cooling fluid within the container or receptacle 20, which cooling fluid is preferably heated to a temperature above normal, as to about 120° F., to prevent too abrupt chilling of the die-carrying member, the die members and the work-pieces carried thereby. The electrodes themselves are cooled, as already indicated above, such cooling taking place not only through the electrodes 117 proper, but also at the rear ends of the electrode holders, in the manner described in detail earlier in this specification.

The work-pieces 43 and 44, having at last had the exposed portions thereof above the bridging arms or members 61 heated to a forging temperature, are now ready to be forged. They are brought into forging position under the punch 161 by the next intermittent step of rotation of the die-carrying member 40 by means of the driving mechanism described earlier in this specification, this driving mechanism preferably embodying a Geneva gear so as to provide the intermittent rotational movements desired for the proper operation of the aforesaid illustrative embodiment of the present invention.

The fully heated ends of the work-pieces 43 and 44 having thus been brought under the punch 161, the punch descends so as to bring the impressions 170 of the die member 162 into operative contact with the ends of the work-pieces which have been heated to a forging temperature. This action is brought about by the downward movement of the punch carrier and the ram as described above. The punch having completed its work now starts to raise. The stripping mechanism having been set during the downward movement of the punch by means of the plungers 191 under the action of the springs 192 on the rods 185 pivoted at their lower ends to the outer ends 182' of the stripping member 182, such stripping member, after the enlarged portions of the rods 185 have been brought to bear against the lower faces of the plates 189', acts against the upper rounded ends 172 of the stripping rods 171 against the action of the springs 173 to thus cause the stripping rods 171 to bear against the formed heads of the work-pieces 43 and 44 to expel such work-pieces if the same should be found to adhere in the impression cavities 170. In its continued rise, the punch brings the members 181 against the cams 187 carried by the rods 185 which, are thus swung outwardly and permitted to pass through the slots 190 in the arcuate members 189, thus completing the forming and stripping operation.

The remaining two states of the intermittent rotation of the die-carrying member 40 carrying the die member 42 and the formed work-pieces 43 and 44 are for the unloading operation which may now be carried out. It may here be stated that the punch, like the electrodes and like the die members, is suitably cooled by the forced circulation of water therethrough in the manner already described. It may here further be stated should the work-pieces extend too great a distance out of the die members 42, the trigger 94 will be acted upon to release the plunger 92 which will thus lift the bolt 81 away from the driving plate 85 and will thus permit such driving plate to be lifted away from and its pins 86 to be raised out of the depressions in the die plate, so that the same will no longer be rotated, although the shaft 81 carrying the driving plate continues its intermittent rotation.

This completes the description of the construction, mode of assembly and operation of the aforesaid illustrative embodiment of the present invention. It will be noted that the machine is simply constructed, may be readily, conveniently and economically fabricated and assembled, and may be conveniently and accurately operated for the desired purpose. The machine has a considerable capacity, eight pairs of work-pieces being capable of being enclosed in the machine, although an even larger number may, if desired, be employed by increasing the number of die members carried by the die-carrying member 40. It will be noted also that the heating operation is conducted in a series of separately regulatable stages calculated to produce the desired heating effect in the most economical and satisfactory manner. Means are also provided for bridging the work-pieces in pairs, so as to localize the heating current and the heating effect in those pairs of the work-pieces which it is desired to heat to a forging temperature and thereafter to forge.

The forming operation is likewise conveniently and economically performed. Means are also provided for centering the forming means over the heated work-pieces, and means are also provided for stripping the formed work-pieces from the forming mechanism. Finally, convenient means are provided for safeguarding the various portions of the machines, particularly the electrodes, the electrode carriers, the die-carrying member and the die members carried thereby, as well as the forming means, from deleterious heating effects in view of the high degree of heat which is usually employed in the machine. Safety means are also provided in the event that the work-pieces are not properly positioned in the die members for the final heating and forming operations. Other advantages and superiorities of the machines of the present invention, particularly as exemplified in the aforesaid illustrative embodiment of the present invention, will readily occur to those skilled in the art to which the present invention relates.

What I claim as my invention is:

1. In an electrical heating device, a die member adapted to receive a plurality of work-pieces to be heated, electrical heating means, means for moving said die member into position to be acted upon by said heating means, and electrically conductive means for bridging said work-pieces to substantially restrict the electrical heating effect to selected parts of said work-pieces.

2. In an electrical heating device, a die member adapted to receive a plurality of work-pieces to be heated, electrical heating means comprising a plurality of heating electrodes, means for moving said die member into position to be acted upon by said heating means, and electrically conductive means for bridging said work-pieces to substantially restrict the lectrical heating effect to selected parts of said work-pieces.

3. In an electrical heating device, a die member adapted to receive a plurality of work-pieces to be heated, electrical heating means, means for moving said die member into position to be acted upon by said heating means, and electrically conductive means comprising a plurality of clamping members for bridging said work-pieces to substantially restrict the electrical heating effect to selected parts of said work-pieces.

4. In an electrical heating device, a die member adapted to receive a plurality of work-pieces to be heated, electrical heating means comprising a plurality of heating electrodes, means for moving said die member into position to be acted upon by said heating means, and electrically conductive means comprising a plurality of clamping members for bridging said work-pieces to substantially restrict the electrical heating effect to selected parts of said work-pieces.

5. In an electrical heating device, a die member adapted to receive a plurality of work-pieces to be heated, electrical heating means, means for moving said die member into position to be acted upon by said heating means, electrically conductive means comprising a plurality of clamping members for bridging said work-pieces to substantially restrict the electrical heating effect to selected parts of said work-pieces, and means for normally maintaining said electrically conductive means in non-bridging position.

6. In an electrical heating device, a die member adapted to receive a plurality of work-pieces to be heated, electrical heating means, means for moving said die member into position to be acted upon by said heating means, electrically conductive means for bridging said work-pieces to substantially restrict the electrical heating effect to selected parts of said work-pieces, and means for normally maintaining said electrically conductive means in non-bridging position.

7. In an electrical heating device, a die member adapted to receive a plurality of work-pieces to be heated, electrical heating means comprising a plurality of heating electrodes, means for moving said die member into position to be acted upon by said heating means, electrically conductive means comprising a plurality of clamping members for bridging said work-pieces to substantially restrict the electrical heating effect to selected parts of said work-pieces, and means for normally maintaining said electrically conductive means in non-bridging position.

8. In an electrical heating device, a die member adapted to receive a plurality of work-pieces to be heated, electrical heating means comprising a plurality of heating electrodes, means for moving said die member into position to be acted upon by said heating means, electrically conductive means comprising a plurality of clamping members for bridging said work-pieces to substantially restrict the electrical heating effect to selected parts of said work-pieces, spring means for normally maintaining said electrically conductive means in non-bridging position, and means comprising a stationary cam guideway acting on the movement of said die member into heating position to overcome the action of said spring means to cause said bridging means to bridge said work-pieces.

9. In an electrical heating device, a die member adapted to receive a plurality of work-pieces to be heated, electrical heating means comprising a plurality of heating electrodes, means for moving said die member into position to be acted upon by said heating means, electrically conductive means for bridging said work-pieces to substantially restrict the electrical heating effect to selected parts of said work-pieces, spring means for normally maintaining said electrically conductive means in non-bridging position, and means comprising a stationary cam guideway acting on the movement of said die member into heating position to overcome the action of said spring means to cause said bridging means to bridge said work-pieces.

10. In an electrical heating and forming device, a movable die member, reciprocatable heating means, reciprocatable forming means, and means for intermittently moving said die member first into heating position and then into forming position.

11. In an electrical heating and forming device, an intermittently rotatable die member, reciprocatable heating means, reciprocatable forming means, and means for intermittently moving said die member first into heating position and then into forming position.

12. In an electrical heating and forming device, a plurality of intermittently rotatable die members, reciprocatable heating means, reciprocatable forming means, and means for intermittently moving successive die members first into heating position and then into forming position.

13. In an electrical heating and forming device, an intermittently rotatable die member, reciprocatable heating means comprising a plurality of reciprocatable heating electrodes, reciprocatable forming means, and means for intermittently moving said die member first into heating position and then into forming position.

14. In an electrical heating and forming device, a plurality of intermittently rotatable die members, reciprocatable heating means comprising a plurality of sets of reciprocatable heating electrodes, reciprocatable forming means, and means for intermittently moving successive die members first into heating position and then into forming position.

15. In an electrical heating and forming device, a plurality of intermittently rotatable die members, intermittently rotatable supporting means for said die members, reciprocatable heating means comprising a plurality of sets of reciprocatable heating electrodes, reciprocatable forming means, and means for intermittently moving successive die members first into heating position and then into forming positaion.

16. In an electrical heating device, a rotatable die-carrying member, a plurality of die members carried by said rotatable die-carrying member, a plurality of pairs of electrodes, and means for bringing said pairs of electrodes into operative heating contact with work-pieces positioned in said die members.

17. In an electrical heating device, a rotatable die-carrying member, a plurality of die members carried by said rotatable die-carrying member, a plurality of pairs of electrodes, and intermittently reciprocatable means for simultaneously bringing said pairs of electrodes into operative heating contact with work-pieces positioned in said die members.

18. In an electrical heating device, a rotatable die-carrying member, a die member carried by said rotatable die-carrying member, a pair of electrodes, and intermittently reciprocatable means for bringing said electrodes into operative heating contact with work-pieces positioned in said die member, in combination with means associated with said electrodes for closing the heating circuit through said pair of electrodes only after said electrodes are in contact with the work-pieces contained in said die member.

19. In an electrical heating device, a rotatable die-carrying member, a die member carried by said rotatable die-carrying member, a pair of electrodes, and means for bringing said electrodes into operative heating contact with work-pieces positioned in said die member, in combination with means associated with said electrodes for closing the heating circuit through said pair of electrodes only after said electrodes are in contact with the work-pieces contained in said die member.

20. In an electrical heating device, a rotatable die-carrying member, a plurality of die members carried by said rotatable die-carrying member, a pair of electrodes, and intermittently reciprocatable means for simultaneously bringing said electrodes into operative heating contact with work-pieces positioned in said die members, in combination with means associated with said electrodes for closing the heating circuit through said electrodes only after said electrodes are in contact with the work-pieces contained in said die members.

21. In an electrical heating device, a rotatable die-carrying member, a plurality of the die members carried by said rotatable die-carrying member, a pair of electrodes, and means for simultaneously bringing said electrodes into operative heating contact with work-pieces positioned in said die members, in combination with means associated with said electrodes for closing the heating circuit through said electrodes only after said electrodes are in contact with the work-pieces contained in said die members.

22. In an electrical heating device, a rotatable die-carrying member, a die member carried by said rotatable die-carrying member, a pair of electrodes, and intermittently reciprocatable means for bringing said electrodes into operative heating contact with work-pieces positioned in said die member, in combination with means associated with said electrodes for closing the heating circuit through said electrodes only after said electrodes are in contact with the work-pieces contained in said die member and for breaking the heating circuit only while said electrodes are in contact with the work-pieces contained in said die member.

23. In an electrical heating device, a rotatable die-carrying member, a die member carried by said rotatable die-carrying member, a pair of electrodes, and means for bringing said electrodes into operative heating contact with work-pieces positioned in said die member, in combination with means associated with said electrodes for closing the heating circuit through said electrodes only after said electrodes are in contact with the work-pieces contained in said die member and for breaking the heating circuit only while said electrodes are in contact with the work-pieces contained in said die member.

24. In an electrical heating device, a rotatable die-carrying member, a plurality of die members carried by said rotatable die-carrying member, a plurality of pairs of electrodes, and intermittently reciprocatable means for simultaneously bringing said pairs of electrodes into operative heating contact with work-pieces positioned in said die members, in combination with means associated with said electrodes for closing the heating circuit through each pair of electrodes only after said electrodes are in contact with the work-pieces contained in said die members and for breaking the heating circuit only while said electrodes are in contact with the work-pieces contained in said die members.

25. In an electrical heating device, a rotatable die-carrying member, a plurality of die members carried by said rotatable die-carrying member, a plurality of pairs of electrodes, and means for simultaneously bringing said pairs of electrodes into operative heating contact with work-pieces positioned in said die members, in combination with means associated with said electrodes for closing the heating circuit through each pair of electrodes only after said electrodes are in contact with the work-pieces contained in said die members and for breaking the heating circuit only while said electrodes are in contact with the work-pieces contained in said die members.

26. In an electrical heating device, a rotatable die-carrying member, a die member carried by said rotatable die-carrying member, a pair of electrodes, and intermittently reciprocatable means for bringing said electrodes into operative heating contact with work-pieces positioned in said die member, in combination with an outer container and a cooling fluid within said container.

27. In an electrical heating device, a rotatable die-carrying member, a plurality of die members carried by said rotatable die-carrying member, a pair of electrodes, and means for bringing said electrodes into operative heating contact with work-pieces positioned in said die members, in combination with an outer container and a cooling fluid within said container.

28. In an electrical heating device, a rotatable die-carrying member, a plurality of die members carried by said rotatable die-carrying member, a plurality of pairs of electrodes, and intermittently reciprocatable means for simultaneously bringing said pairs of electrodes into operative heating contact with work-pieces positioned in said die members, in combination with an outer container and a cooling fluid within said container.

29. In an electrical heating device, a rotatable die-carrying member, a die member carried by said rotatable die-carrying member, a pair of electrodes, and intermittently reciprocatable means for simultaneously bringing said electrodes into operative heating contact with work-pieces positioned in said die member, in combination with an outer container and an alkaline cooling fluid within said container.

30. In an electrical heating device, a rotatable die-carrying member, a plurality of die members carried by said rotatable die-carrying member, a pair of electrodes, and means for simultaneously bringing said electrodes into operative heating contact with work-pieces positioned in said die members, in combination with an outer container and an alkaline cooling fluid within said container.

31. In an electrical heating device, a rotatable die-carrying member, a plurality of die members carried by said rotatable die-carrying member, a plurality of pairs of electrodes, and means for simultaneously bringing said pairs of electrodes into operative heating contact with work-pieces positioned in said die members, in combination with an outer container, a cooling fluid within said container, and means for circulating said cooling fluid.

32. In an electrical heating device, a rotatable die-carrying member, a die member carried by said rotatable die-carrying member, a pair of electrodes, and means for bringing said electrodes into operative heating contact with work-pieces positioned in said die member, in combination with an outer container, a cooling fluid within said container, and means for circulating said cooling fluid.

33. In an electrical heating and heading device, a rotatable die-carrying member, a die member carried by said rotatable die-carrying member, a pair of electrodes, and intermittently reciprocatable means for simultaneously bringing said electrodes into operative heating contact with work-pieces positioned in said die member, in combination with an outer container and a cooling fluid within said container and means for forming the heated work-pieces.

34. In an electrical heating and heading device, a rotatable die-carrying member, a plurality of die members carried by said rotatable die-carrying member, a pair of electrodes, and means for simultaneously bringing said electrodes into operative heating contact with work-pieces positioned in said die members, in combination with an outer container and a cooling fluid within said container and means for forming the heated work-pieces.

35. In an electrical heating and heading device, a rotatable die-carrying member, a plurality of die members carried by said rotatable die-carrying member, a plurality of pairs of electrodes, and means for simultaneously bringing said pairs of electrodes into operative heating contact with work-pieces positioned in said die members, in combination with an outer container and a cooling fluid within said container, in combination with means for forming the heated work-pieces and for ejecting the formed work-pieces from the die members.

36. In an electrical heating and heading device, a rotatable die-carrying member, a die member carried by said rotatable die-carrying member, a pair of electrodes, and means for bringing said electrodes into operative heating contact with work-pieces positioned in said die member, in combination with an outer container and a cooling fluid within said container and means for forming the heated work-pieces and for ejecting the formed work-pieces from the die member.

37. In an electric heating device, a movable die member receptive of work to be heated, heating means, and cam actuated means for raising and lowering said work into and out of the heating position.

38. In an electric heating device, a movable heating member receptive of work to be heated, heating means, and a cam wipingly engaging said work to raise and lower the same into and out of heating position, said cam comprising a rail having spaced depressions in its engaging face.

39. In an electric heating device, a movable die member receptive of work to be heated, heating means, and a cam wipingly engaging said work to raise and lower the same into and out of heating position, said cam comprising a continuous circular rail having one or more spaced depressions in its engaging face.

In testimony, whereof, I have signed my name to this specification this 27th day of April, 1927.

FRANK P. KOBERT.